(12) United States Patent
Yuan et al.

(10) Patent No.: US 10,164,937 B2
(45) Date of Patent: Dec. 25, 2018

(54) METHOD FOR PROCESSING RAW IP PACKET AND DEVICE THEREOF

(71) Applicant: ZTE Corporation, Shenzhen (CN)

(72) Inventors: Bo Yuan, Shenzhen (CN); Kun Zheng, Shenzhen (CN); Liang Fan, Shenzhen (CN)

(73) Assignee: SHANGHAI ZHONGXING SOFTWARE COMPANY LIMITED, Shanghai (CN)

( * ) Notice: Subject to any disclaimer, the term of this patent is extended or adjusted under 35 U.S.C. 154(b) by 230 days.

(21) Appl. No.: 14/909,189

(22) PCT Filed: Jun. 17, 2014

(86) PCT No.: PCT/CN2014/080148
§ 371 (c)(1),
(2) Date: Feb. 1, 2016

(87) PCT Pub. No.: WO2015/014167
PCT Pub. Date: Feb. 5, 2015

(65) Prior Publication Data
US 2016/0164830 A1 Jun. 9, 2016

(30) Foreign Application Priority Data
Jul. 30, 2013 (CN) .......................... 2013 1 0327005

(51) Int. Cl.
*H04L 29/12* (2006.01)
*H04L 12/66* (2006.01)
*H04L 12/741* (2013.01)

(52) U.S. Cl.
CPC .......... *H04L 61/2015* (2013.01); *H04L 12/66* (2013.01); *H04L 45/74* (2013.01); *H04L 61/2007* (2013.01); *H04L 61/2514* (2013.01)

(58) Field of Classification Search
None
See application file for complete search history.

(56) References Cited

U.S. PATENT DOCUMENTS

| 2009/0073998 | A1* | 3/2009 | Allan | .............. H04L 12/4625 370/401 |
| 2012/0179830 | A1* | 7/2012 | Ait-Ameur | .......... H04L 67/34 709/228 |
| 2013/0094487 | A1* | 4/2013 | Rui | ................... H04M 15/66 370/338 |

FOREIGN PATENT DOCUMENTS

| CN | 101286918 A | 10/2008 |
| CN | 102340866 A | 2/2012 |

(Continued)

OTHER PUBLICATIONS

Anonymous, "A+P: An Alternative to LSN or CGN Fast Lane US Blog", Oct. 17, 2011, pp. 1-4.

(Continued)

*Primary Examiner* — James P Duffy
(74) *Attorney, Agent, or Firm* — Cantor Colburn LLP (57) ABSTRACT

Methods for processing a raw Internet Protocol (IP) packet and corresponding devices are provided. A method is applied on a Broadband Network Gateway (BNG) side, and the method includes that it is acquired that after a Customer Premises Equipment (CPE) goes on line, a public network IP address and a public network identifier range are allocated to the CPE; and after a downlink raw IP packet is received, the packet is forwarded to a corresponding CPE according to a destination IP address of the packet and a route of a public network identifier, another method is applied on a CPE side, and the includes that: a public network IP address and a public network identifier range allocated by a BNG are received; after an uplink raw IP packet transmitted by a user is received, a source IP address in the packet is replaced with (Continued)

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Identifier value        |       Identifier mask         |
+-+-+-+-+-+-+-+-+-+-+-+-+-+-+-+-+-+-+-+-+-+-+-+-+-+-+-+-+-+-+-+-+
``` the public network IP address, a value of an identifier field in the packet is replaced with a value in the public network identifier range allocated by the BNG, and then the uplink raw IP packet is transmitted to the BNG. The present invention remedies the defect that an existing Network Address Translation (NAT) technology does not support forwarding of a raw IP packet.

14 Claims, 7 Drawing Sheets

(56) References Cited

FOREIGN PATENT DOCUMENTS

| | | |
|---|---|---|
| CN | 102740401 A | 10/2012 |
| CN | 103139222 | 6/2013 |

OTHER PUBLICATIONS

Boucadair M et al, "IPv4 Connectivity Access in the Context of IPv4 Address Exhaustion: Port Range based IP Architecture; draft-boucadair-port-range-02.txt", Internet Engineering Task Force, Jul. 3, 2009, No. 2.

Bush R et al, "The Address plus Port (A+P) APproach to the IPv4 Address Shortage; rfc6346.txt", Internet Engineering Task Force, Aug. 26, 2011, pp. 1-38.

European Search Report for corresponding application EP 14 83 2965; dated Jun. 22, 2016.

International Search Report for corresponding application No. PCT/CN2014/080148 filed Jun. 17, 2014; dated Sep. 24, 2014.

\* cited by examiner

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Identifier value         |       Identifier mask         |
+-+-+-+-+-+-+-+-+-+-+-+-+-+-+-+-+-+-+-+-+-+-+-+-+-+-+-+-+-+-+-+-+
```

METHOD FOR PROCESSING RAW IP PACKET AND DEVICE THEREOF

TECHNICAL FIELD

The present invention relates to the field of communications, particularly to methods for processing raw Internet Protocol (IP) packets and devices thereof.

BACKGROUND

Carrier-Grade NAT (CGN) is a technology for address translation in a network of an operator. With the exhaustion of Internet Protocol version 4 (IPv4) address resources, operators urgently need to solve the problem of address resources, and one of the technologies is that an operator uses a private (reserved) address internally and deploys a CGN service on a Broadband Network Gateway (BNG) at an Internet portal of the operator. When a user accesses the Internet, the BNG translates an internal IPv4 addresses into a public network address through CGN, and when a network of the operator is accessed from the Internet, a CGN device translates a public network address into an internal address of the operator.

The operator implements the CGN function by integrating a CGN service card at the BNG. Although such a technology has become mature, there are still certain disadvantages. Firstly, all traffic of access of private networks to public networks on the BNG will be processed by the CGN service card while the CGN service card has limited forwarding performance and CGN translation processing capability, thus the CGN service card will become a serious performance bottleneck for the BNG to carry out broadband services. In the meanwhile, the CGN service card is actually a new hardware fault point for a BNG device. A failure occurring on a CGN service card may cause abnormality in services of all broadband users accessed by this BNG, which will interrupt a service currently browsed by a user in a slight degree and block all user services in a serious degree.

For this reason, Address Plus Port (A+P) technology is a more effective CGN solution, which uses the core concept of CGN principles. However, different from a mainstream CGN solution, A+P technology shifts the CGN function down to a Customer Premises Equipment (CPE) of a user (wherein the CPE includes an enterprise router and a Home Gateway (HG)). When the CPE goes on line, a BNG directly allocates a public network IPv4 address and a port range for translation to the CPE, and then the CPE provides a Network Address Translation (NAT) service for a user terminal in a service range according to the address and the port range according to the following specific flow.

The CPE goes on line via the BNG.

The BNG configures a public network IPv4 address and a transport layer public network port range for the CPE, wherein the BNG delivers the allocated transport layer public network port range to the CPE through Dynamic Host Configuration Protocol (DHCP) or Point-to-Point Protocol Over Ethernet (PPPoE).

When the network where the user host locates is an IPv4 local area network, the CPE allocates a private network IPv4 address for the user host.

NAT translation is performed at the CPE for a source IP addresses and a source port of an uplink private network IPv4 data packet from a user side to a network side, a translated public network address is a public network IP address allocated by the BNG, a public network port is allocated in a public network port range allocated by the BNG, and an NAT mapping entry is generated at the CPE.

After the CPE transmits the translated IPv4 data packet to the BNG, the BNG forwards the packet to a public network according to a destination IP address.

When the traffic of a downlink IPv4 data packet from the network side to the user side passes the BNG, the BNG forwards the downlink IPv4 data packet to an appropriate CPE according to a destination IP address of the packet and a route of a destination port.

When receiving the downlink IPv4 data packet, the CPE translates a public network address and a port back to a corresponding private network address and a corresponding port according to a stored mapping entry, and forwards the downlink IPv4 data packet to a corresponding user host.

Generally, IP packets transmitted in a network may be divided into Transmission Control Protocol (TCP) packets and User Datagram Protocol (UDP) packets according to protocols of a transport layer, and non-TCP/UDP packets are collectively referred to as raw IP packets. It may be learned from the A+P flow that the CPE performs the A+P translation mainly according to the public network IP address and the transport layer port range allocated by the BNG, and the BNG also forwards the downlink IP packet to a user according to the public network IP address and an allocated transport layer port, thus such a service flow may have some problems. For example, transport layer protocols that support a port only include TCP and UDP, and packets of many raw IP protocols, such as an Internet Control Message Protocol (ICMP) packet, do not have a concept of a transport layer port. Thus for these packets, the BNG cannot forward downlink packets to broadband users normally according to public network IP addresses and ports, and these packets cannot be processed normally.

SUMMARY

Embodiments of the present invention aim to provide a method for processing a raw IP packet and a corresponding device so as to solve the defect that a raw IP packet cannot be processed in the traditional art.

To solve the problem, an embodiment of the present invention provides a method for processing a raw IP packet, the method applied on a BNG side and includes that:

after it is acquired that a CPE goes on line, a public network IP address and a public network identifier range are allocated to the CPE; and after a downlink raw IP packet is received, the packet is forwarded to a corresponding CPE according to a destination IP address of the downlink raw IP packet and a route of an identifier.

Preferably, the step that the BNG allocates the public network IP address and the public network identifier range to the CPE may includes that:

the BNG allocates the public network IP address, a transport layer port range and the public network identifier range to the CPE.

Preferably, the step that the BNG allocates the public network IP address and the public network identifier range to the CPE may include that the BNG delivers the public network IP address and the public network identifier range to the CPE through an option in DHCP or PPPoE.

Preferably, the option allocated by the BNG may include two fields, an identifier value and an identifier mask, wherein a comparison result of the identifier value and the identifier mask represents the public network identifier range allocated by the BNG to the CPE.

Preferably, the comparison result of the identifier value and the identifier mask may further represent the transport layer port range allocated by the BNG to the CPE.

Preferably, the method may further include that:

the BNG instructs a protocol type applicable to the allocated public network IP address and identifier range when allocating the public network IP address and the identifier range to the CPE.

In addition, an embodiment of the present invention further provides a method for processing a raw IP packet, the method applied on a CPE side and includes that:

a public network IP address and a public network identifier range allocated by a BNG are received; and after an uplink raw IP packet transmitted by a user is received, a source IP address in the uplink raw IP packet is replaced with the public network IP address, a value of an identifier field in the uplink raw IP packet is replaced with a value in the public network identifier range allocated by the BNG, and then the uplink raw IP packet is transmitted to the BNG.

Preferably, the step that the public network IP address and the public network identifier range allocated by the BNG are received may include that:

the CPE receives the public network IP address, a transport layer port range and the public network identifier range allocated by the BNG.

Preferably, the step that the public network IP address and the public network identifier range allocated by the BNG are received may include that:

the CPE acquires, through an option in DHCP or PPPoE, the public network IP address and the public network identifier range allocated by the BNG to the CPE.

Preferably, the option received by the CPE may include two fields, an identifier value and an identifier mask, wherein the CPE acquires, through a comparison result of the identifier value and the identifier mask, the public network identifier range allocated by the BNG.

Preferably, the comparison result of the identifier value and the identifier mask may further represent the transport layer port range allocated by the BNG to the CPE.

Preferably, the method may further include that:

the CPE receives a protocol type applicable to the public network IP address and the public network identifier range allocated by the BNG, the step that the source IP address in the uplink raw IP packet is replaced with the public network IP address and the value of the identifier field in the uplink raw IP packet is replaced with a value in the public network identifier range allocated by the BNG after the uplink raw IP packet transmitted by the user is received and then the uplink raw IP packet is transmitted to the BNG may include that:

after the uplink raw IP packet transmitted by the user is received, if it is judged that the uplink raw IP packet belongs to the protocol type applicable to the allocated public network IP address and public network identifier range, the source IP address in the uplink raw IP packet is replaced with the public network IP address, the value of the identifier field in the uplink raw IP packet is replaced with a value in the public network identifier range allocated by the BNG, and then the uplink raw IP packet is transmitted to the BNG.

Preferably, the method may further include that:

after the source IP address in the uplink raw IP packet is replaced with the public network IP address, and the value of the identifier field in the uplink raw IP packet is replaced with a value in the public network identifier range allocated by the BNG, corresponding relations between the IP addresses and the values of the identifier fields before and after the replacement are stored;

after receiving a downlink raw IP packet transmitted by the BNG, CPE replaces, according to the corresponding relations, a destination IP address in the downlink raw IP packet with a corresponding private network IP address, replaces a value of an identifier field in the downlink raw IP packet with a corresponding identifier value, and then transmits the downlink raw IP packet.

Accordingly, an embodiment of the present invention further provides a BNG, which includes:

an access unit configured to allocate, after acquiring that a CPE goes on line, a public network IP address and a public network identifier range to the CPE; and a route searching unit configured to, after receiving a downlink raw IP packet, forward the packet to a corresponding CPE according to a destination IP address of the downlink raw IP packet and a route of an identifier.

Preferably, the access unit may be further configured to allocate the public network IP address, a transport layer port range and the public network identifier range to the CPE.

Preferably, the access unit may be configured to deliver the public network IP address and the public network identifier range to the CPE through an option in DHCP or PPPoE.

Preferably, the option allocated by the access unit may include 2 fields, an identifier value and an identifier mask, wherein a comparison result of the identifier value and the identifier mask represents the public network identifier range allocated by the BNG to the CPE.

Preferably, the comparison result of the identifier value and the identifier mask may further represent the transport layer port range allocated by the access unit to the CPE.

Preferably, the access unit may be further configured to, when allocating the public network IP address and the identifier range to the CPE, instruct a protocol type applicable to the allocated public network IP address and identifier range to the CPE.

Accordingly, an embodiment of the present invention further provides a CPE, including: a protocol processing unit, configured to receive a public network IP address and a public network identifier range allocated by a BNG;

a NAT unit configured to, according to the public network IP address and the public network identifier range received by the protocol processing unit, after receiving an uplink raw IP packet transmitted by a user, replace a source IP address in the uplink raw IP packet with the public network IP address, replace a value of an identifier field in the uplink raw IP packet with a value in the public network identifier range allocated by the BNG, and then transmit the uplink raw IP packet to the BNG.

Preferably, the protocol processing unit may be configured to receive the public network IP address, a transport layer port range and the public network identifier range allocated by the BNG.

Preferably, the protocol processing unit may be configured to acquire, through an option in DHCP or PPPoE, the public network IP address and the public network identifier range allocated by the BNG to the CPE.

Preferably, the option received by the protocol processing unit may include 2 fields, an identifier value and an identifier mask, wherein the protocol processing unit is configured to acquire, through a comparison result of the identifier value and the identifier mask, the public network identifier range allocated by the BNG.

Preferably, the protocol processing unit may be further configured to acquire, by comparing the identifier value and the identifier mask, the transport layer port range allocated by the BNG to the CPE.

Preferably, the protocol processing unit may be further configured to receive a protocol type applicable to the public network IP address and the public network identifier range instructed and allocated by the BNG, and the NAT unit may be configured to, after receiving the uplink raw IP packet transmitted by the user and if judging that the uplink raw IP packet belongs to the protocol type applicable to the allocated public network IP address and public network identifier range, replace the source IP address in the uplink raw IP packet with the public network IP address, replace the value of the identifier field in the uplink raw IP packet with a value in the public network identifier range allocated by the BNG, and then transmit the uplink raw IP packet to the BNG.

Preferably, the NAT unit may be further configured to, after replacing the source IP address in the uplink raw IP packet with the public network IP address, and replacing the value of the identifier field in the uplink raw IP packet with a value in the public network identifier range allocated by the BNG, store corresponding relations between the IP addresses and the values of the identifier fields before and after the replacement; and the NAT unit may be further configured to, after receiving a downlink raw IP packet transmitted by the BNG, replace, according to the corresponding relations, a destination IP address in the downlink raw IP packet with a corresponding private network IP address, replace a value of an identifier field in the downlink raw IP packet with a corresponding identifier value, and then transmit the downlink raw IP packet.

The embodiments of the present invention remedy the defect that an existing NAT technology does not support forwarding of a raw IP packet, so that the NAT technology and a NAT device can be widely applied and deployed.

DETAILED DESCRIPTION OF THE EMBODIMENTS

The embodiments of the present invention will be expounded hereinafter with reference to the accompanying drawings so that the purposes, technical solutions and advantages of the present invention are clearer. It needs to be noted that the embodiments in the present application and the characteristics in the embodiments may be combined randomly if there is no conflict.

Figure 1A:
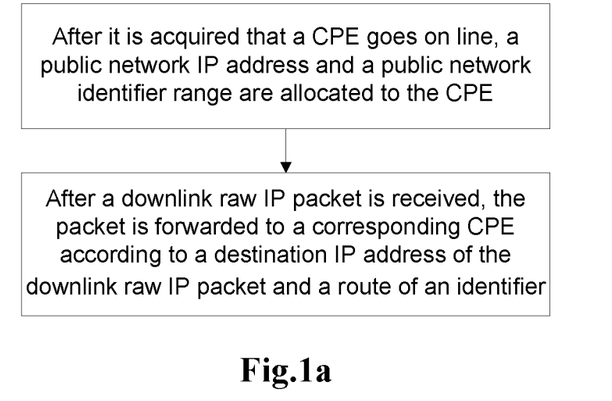
FIG. 1(a) and FIG. 1(b) are respective flowcharts of a method for processing a RAW IP packet at a BNG side and a CPE side in an embodiment of the present invention.

In the present embodiment, a method for processing a raw IP packet is applied on a BNG side, as shown in FIG. 1(a), the method includes that:

after it is acquired that a CPE goes on line, a public network IP address and a public network identifier range are allocated to the CPE; and after a downlink raw IP packet is received, the packet is forwarded to a corresponding CPE according to a destination IP address of the downlink raw IP packet and a route of an identifier.

Figure 1B:
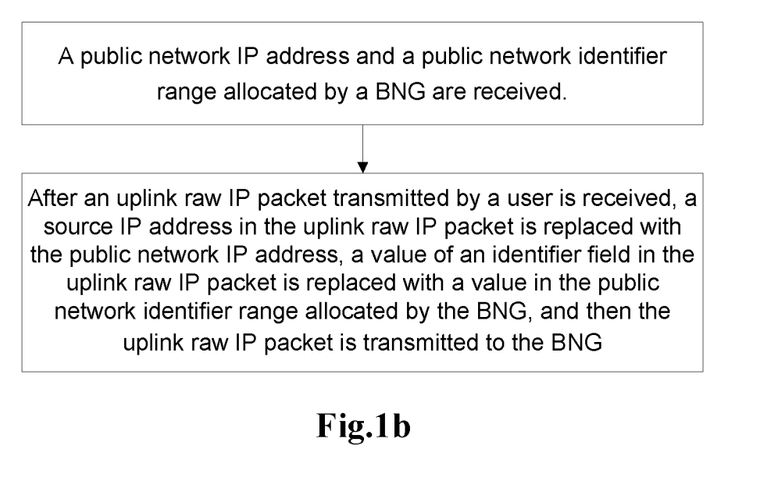

Accordingly, a method for processing a raw IP packet is applied on a CPE side, as shown in FIG. 1(b), including that:

a public network IP address and a public network identifier range allocated by a BNG are received; and after an uplink raw IP packet transmitted by a user is received, a source IP address in the uplink raw IP packet is replaced with the public network IP address, a value of an identifier field in the uplink raw IP packet is replaced with a value in the public network identifier range allocated by the BNG, and then the uplink raw IP packet is transmitted to the BNG.

Figure 2:
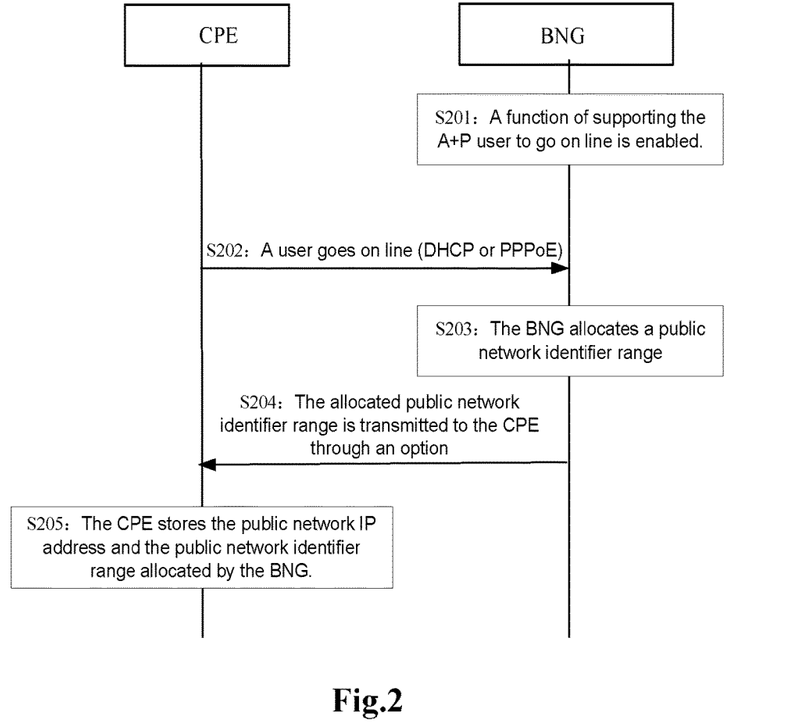
FIG. 2 is a schematic diagram of a process in which a BNG allocates a public network identifier range in an embodiment of the present invention.

Specifically, in the present embodiment, a method for a BNG to allocate a public network identifier range is as shown in FIG. 2 and mainly includes the following steps.

Step 201: On a BNG, the function of supporting an A+P user to go on line is enabled.

Step 202: After a CPE goes on line, an address is acquired through DHCP or PPPoE.

Step 203: The BNG allocates a public network IP address and a public network identifier range to the CPE.

Step 204: The BNG delivers a routing list including the public network IP address and the public network identifier range.

Preferably, the BNG delivers the allocated public network identifier range to the CPE through an option of DHCP or PPPoE.

Step 205: The CPE stores the public network IP address and the public network identifier range allocated by the BNG, and uses the same when performing NAT translation for a raw IP packet.

Figure 3:
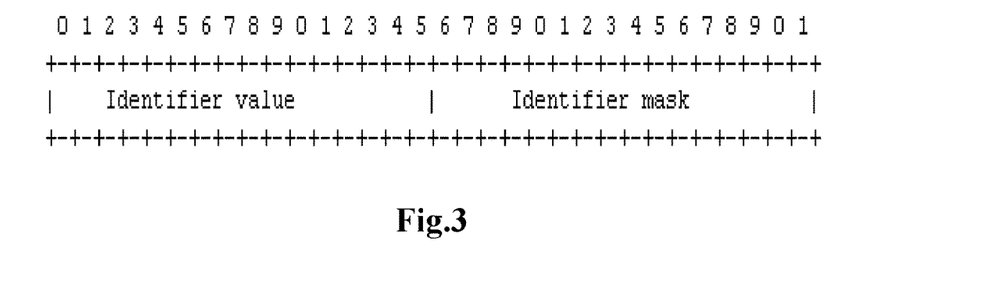
FIG. 3 is a schematic diagram of a value format of a Tag-Length-Value (TLV) in an option used in allocation of a public network identifier range by a BNG in an embodiment of the present invention.

Further, a format of the option of such a public network identifier range allocated by the BNG defines two fields to represent the identifier range, and both the BNG and the CPE calculate a public network identifier usage range of the A+P user through these two fields. Formats of these two fields may correspondingly refer to an option format of DHCP or PPPoE, and both apply a TLV, wherein as shown in FIG. 3, a value includes two fields: an identifier value and an identifier mask. A comparison result of the identifier value and the identifier mask represents the identifier range allocated by the BNG to the CPE, and when the value of certain bit in the identifier mask field is 1, it is indicated that the value of the corresponding location in the identifier value field is unalterable. For example:

when a value of the identifier value field is 0000 0110 0000 0000; and when a value of the identifier mask field is 1111 1110 0000 0000, it is indicated by comparing the identifier value and the identifier mask that the first 7 digits in the identifier value field are unalterable, and can be only 0000011, and the last 9 digits may be changed between 0 and 1. Therefore, the public network identifier range allocated to the A+P user is between 1536 and 2047.

Figure 4:
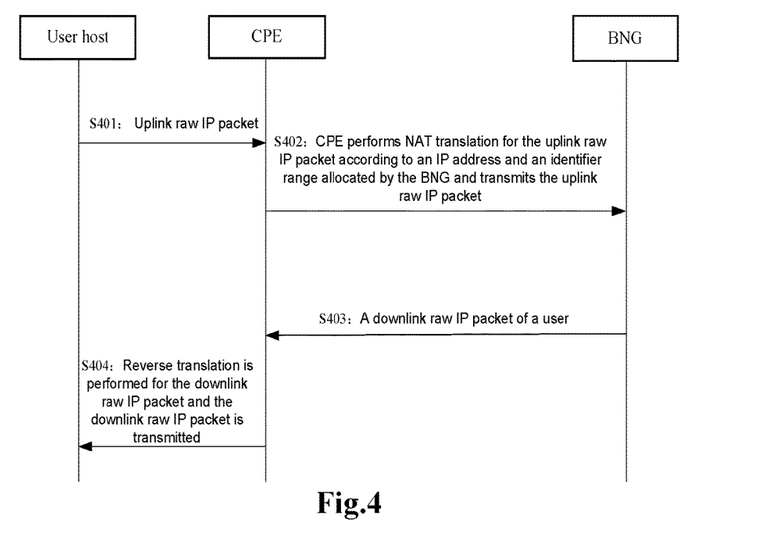
FIG. 4 is a schematic diagram of a process in which a CPE processes a raw IP packet in an embodiment of the present invention.

Further, a process in which a CPE processes a raw IP packet of an A+P user is as shown in FIG. 4, including:

Step 401: A CPE receives an uplink raw IP packet transmitted by a user.

Step 402: The CPE performs NAT translation for the uplink raw IP packet, replaces a source IP address in the raw IP packet with a public address IP address allocated by a BNG, replaces an identifier field with a value in a public network identifier range allocated by the BNG to the CPE, and stores a mapping relation between the IP addresses before and after the replacement and a mapping relation between the identifier values before and after the replacement, and then transmits the uplink raw IP packet having been subjected to the NAT translation to the BNG.

Step 403: A downlink raw IP packet of a user, which is transmitted by the BNG, is received.

Step 404: The CPE translates a public network raw IP packet into a private network raw IP packet according a pre-stored mapping relation and then transmits the private network raw IP packet to a corresponding A+P user.

Figure 5:
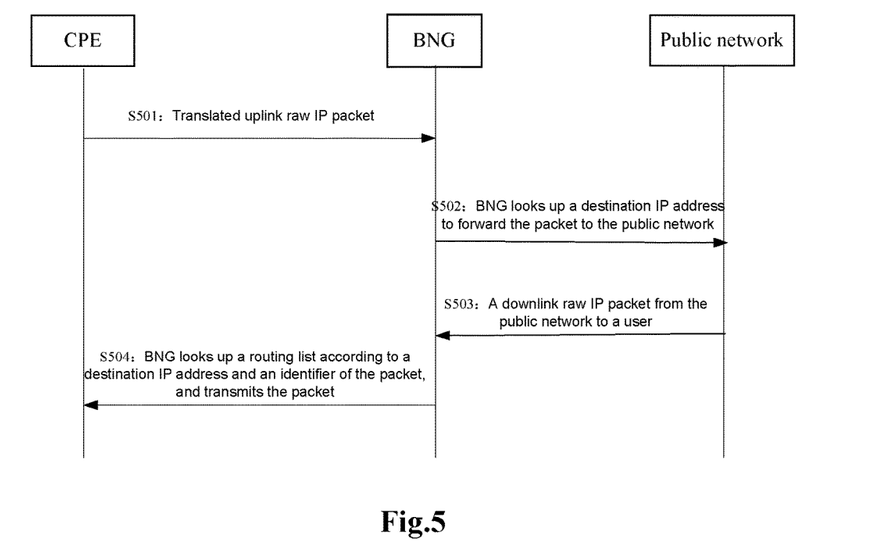
FIG. 5 is a schematic diagram of a process in which a BNG processes a raw IP packet in an embodiment of the present invention.

Further, FIG. 5 shows steps that a BNG processes a raw IP packet of an A+P user, including:

Step 501: A BNG receives an uplink raw IP packet transmitted by a CPE.

Step 502: The BNG forwards the uplink raw IP packet by looking up a route of the destination IP address.

Step 503: The BNG receives a downlink raw IP packet transmitted via a public network to an A+P user.

Step 504: The BNG forwards the packet by looking up a destination IP address and a route of a public network identifier.

Figure 6:
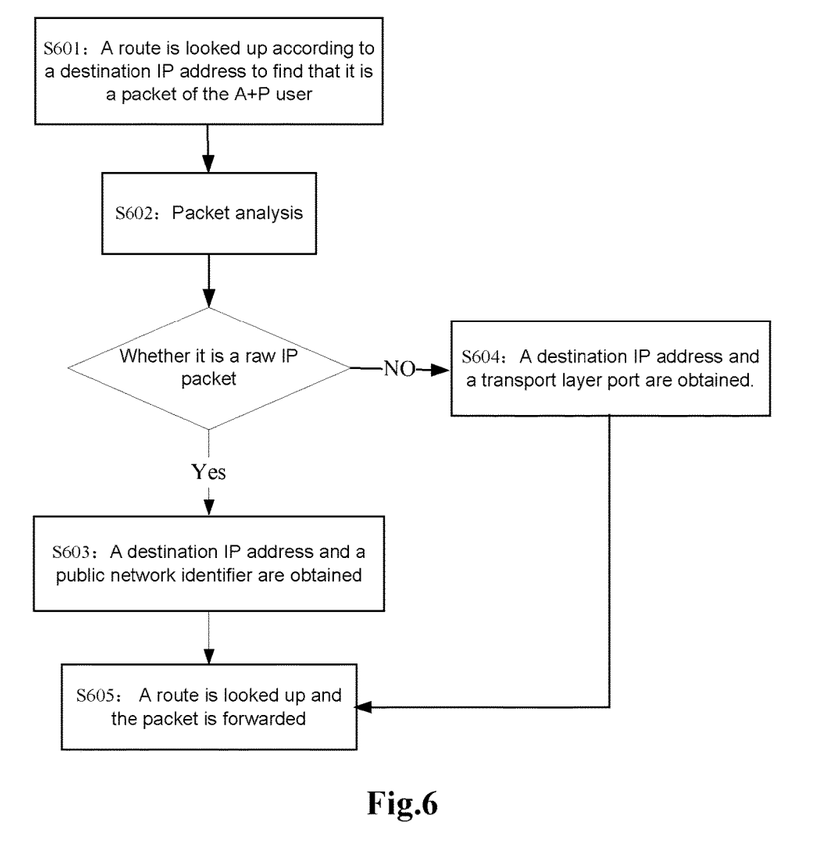
FIG. 6 is a schematic diagram of a process in which a BNG processes a raw IP packet from a public network to an A+P user side in an embodiment of the present invention.

Further, a processing flow performed when the BNG receives the packet transmitted by the public network to the A+P user in Step 504 is as shown in FIG. 6 and includes:

Step 601: The BNG finds that it is an A+P user by looking up a route according to the destination IP address (for example, the BNG looks up an IP route to find that the destination IP address belongs to an address field allocated to an A+P user).

Step 602: The BNG distinguishes whether the received packet is a raw IP packet or a TCP/UDP packet.

Step 603: If the packet is a raw IP packet, a destination IP address and a public network identifier are acquired and then Step 605 is performed.

Step 604: If the packet is a TCP/UDP packet, a destination IP address and a transport layer port are acquired.

Step 605: An A+P route is look up and forward the packet.

Further, such a method of adding a new attribute of an address acquisition protocol, DHCP or PPPoE to control a CPE to translate a non-TCP/UDP packet is not only applicable to an ICMP packet, but also applicable to other raw IP protocols including a similar identifier field. An identifier is a key field of such protocols and used for uniquely identifying one or more sessions of such protocols. When delivering a value and a mask of an identifier, the BNG may designate a type of a valid protocol at the same time.

Further, the BNG and the CPE may also reuse the original transport layer port range of TCP or UDP in a process that an A+P goes on line to deliver a field. In other words, a public network identifier range is kept consistent with a transport layer port range delivered by the BNG. At the moment, although the public identifier range reuses a transport layer port transmission range, a raw IP packet processing mechanism of the CPE and the BNG is consistent as that described above.

The present invention will be further described according to the follow three examples.

EXAMPLE 1

Figure 7:
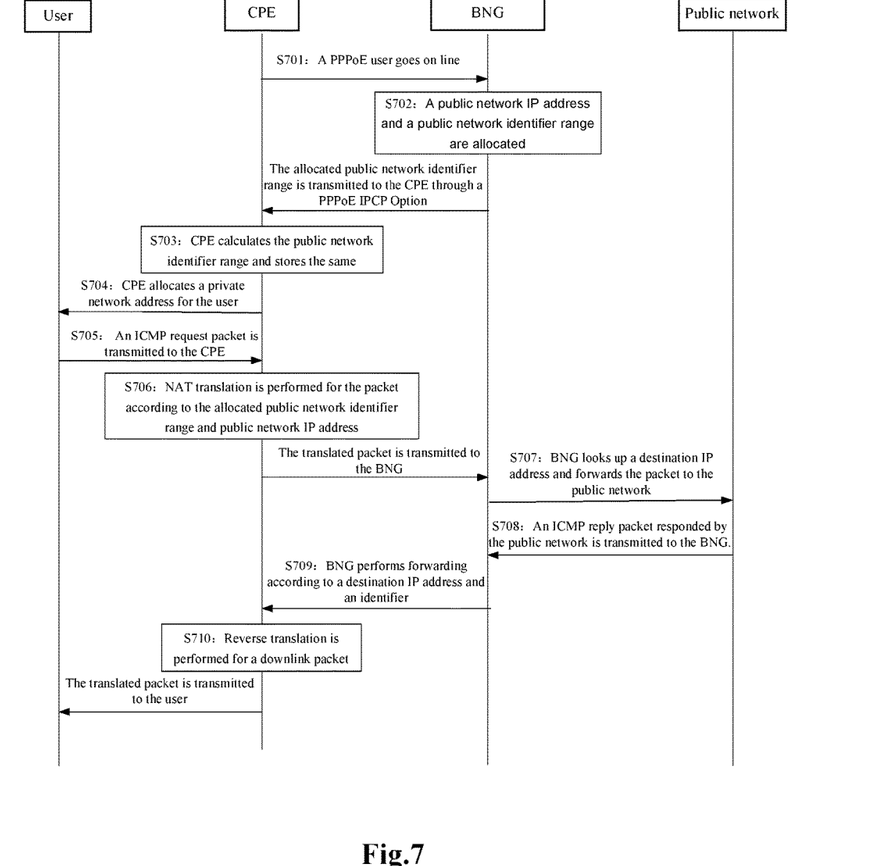
FIG. 7 is a schematic diagram of an ICMP processing process of an A+P user dialling through PPPoE in the first application example of the present invention.

FIG. 7 shows a translation method in which a CPE of an A+P user applies a PPPoE dialling method and a BNG allocates an identifier range of an ICMP packet to control the ICMP packet, specifically including:

Step 701: A user goes on line through PPPoE dialling to acquire an IP address.

Step 702: A BNG allocates a public network IP address and a public network identifier range to the user.

Further, the BNG delivers the identifier range to a CPE by a PPPoE-defined Internet Protocol Control Protocol (IPCP) option, and the option includes two fields, an identifier value and an identifier mask.

Step 703: The CPE acquires the option, and calculates, according to the identifier value and the identifier mask, the public network identifier range allocated by the BNG and stores the same.

Step 704: The CPE allocates a private network address for a user host.

Step 705: A user host mounted on the CPE pings the address of Sina.com.cn and transmits an ICMP request packet to the CPE.

Step 706: The CPE performs translation from private network ICMP to public network ICMP for the ICMP request packet according to the public network IP address and the public network identifier range allocated by the BNG, including translation of a source IP address and translation of an identifier, and transmits the translated ICMP request packet to the BNG.

Step 707: The BNG forwards the ICMP request packet according to the destination IP address.

Step 708: The BNG receives an ICMP reply packet responded by the network side.

Step 709: The BNG obtains a destination IP address and an identifier from the ICMP reply packet, and looks up a route according to the destination IP address and a range where the identifier locates, and then transmits the packet to a corresponding CPE.

Step 710: After receiving the ICMP reply packet, the CPE translates the destination IP address and the identifier for the ICMP reply packet according to a pre-stored translation relation from an ICMP private network to a public network, and transmits the ICMP reply packet acquired after the translation to the user host.

EXAMPLE 2

Figure 8:
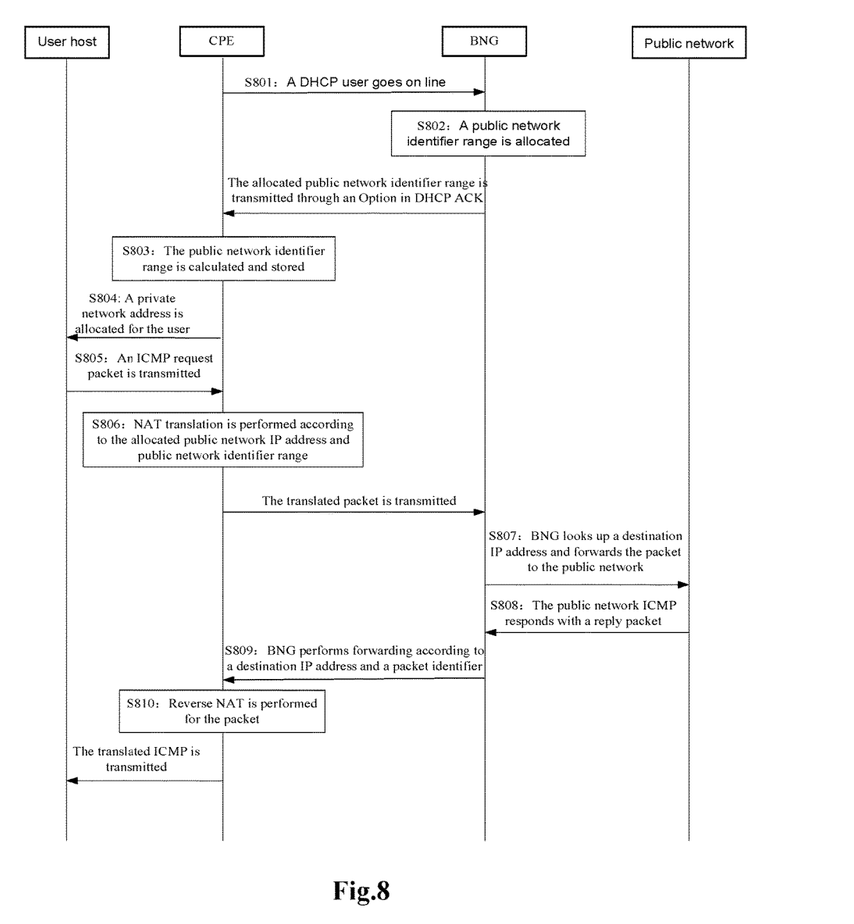
FIG. 8 is a schematic diagram of an ICMP processing process of an A+P user applying a DHCP address acquisition method in the second application example of the present invention.

FIG. 8 shows a translation method in which a CPE of an A+P user applies DHCP address acquisition method, and a BNG allocates an identifier range of an ICMP packet to control the ICMP packet, including:

Step 801: A user goes on line through DHCP to acquire an IP address.

Step 802: A BNG allocates a public network IP address to the user while allocating a public network identifier range.

Further, the BNG delivers the identifier range to a CPE by an option in a DHCP acknowledgement (ACK) packet and the option includes 2 fields, an identifier value and an identifier mask.

Step 803: The CPE acquires the option, and calculates, according to the identifier value and the identifier mask, the public network identifier range allocated by the BNG and stores the same.

Step 804: The CPE allocates an address for a user host.

Step 805: A user host mounted on the CPE pings the address of Sina.com.cn and transmits an ICMP request packet to the CPE.

Step 806: The CPE performs translation from private network ICMP to public network ICMP for the ICMP request packet according to the public network IP address and the public network identifier range allocated by the BNG, including translation of a source IP address and translation of an identifier, and transmits the translated ICMP request packet to the BNG.

Step 807: The BNG forwards the ICMP request packet according to a destination IP address.

Step 808: The BNG receives an ICMP reply packet responded by a network side.

Step 809: The BNG acquires a destination IP address and an identifier of an ICMP packet from the ICMP reply packet and searches a route according to the destination IP address and a range where the identifier locates, and then transmits the packet to a corresponding CPE.

Step 810: After receiving the ICMP reply packet, the CPE translates the destination IP address and the identifier for the ICMP reply packet according to a pre-stored translation relation from an ICMP private network to a public network, and transmits the ICMP reply packet acquired after the translation to the user host.

EXAMPLE 3

Figure 9:
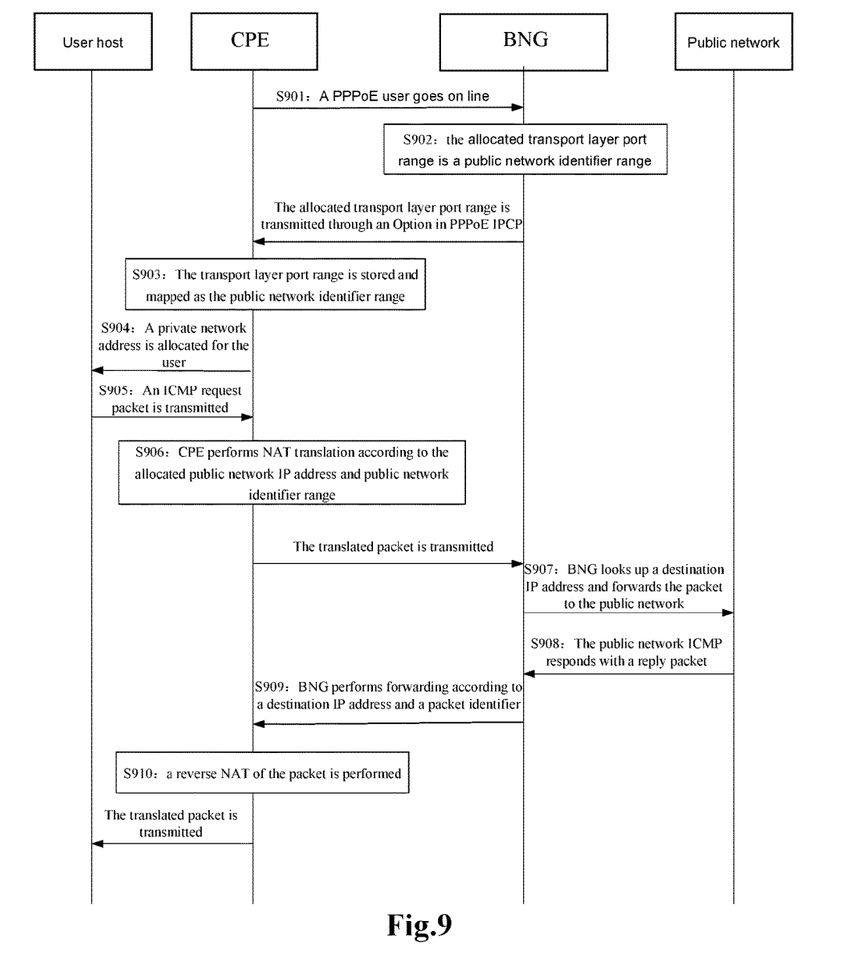
FIG. 9 is a schematic diagram of an ICMP processing process of an A+P user applying a method of a trusted transport layer port range in the third application example of the present invention.

FIG. 9 shows a translation method in which a CPE of an A+P user applies a PPPoE dialling method and a BNG allocates an identifier range of an ICMP packet to control the ICMP packet, wherein the BNG applies an identifier allocation method consistent with a transport layer port, including:

Step 901: A user goes on line through PPPoE dialling to acquire an IP address.

Step 902: A BNG allocates a public network IP address to the user while applying an allocated transport layer port range by default to designate a public network identifier range.

For example, a transport layer TCP/UDP port range is 513 to 1024, and the identifier range is also 513 to 1024. The BNG uses an option of an originally allocated transport layer port range to deliver the identifier range.

Further, the BNG delivers a DHCP transport layer port range to the CPE through an option of a PPPoE IPCP packet and a format of the option may refer to RFC6436.

Step 903: It is set on the CPE that a used transport layer port range is an ICMP identifier range. When acquiring the transport layer port range allocated by the BNG, the CPE also stores the same range as an ICMP identifier range.

Step 904: The CPE allocates a private network address for a user host.

Step 905: A user host mounted on the CPE pings the address of Sina.com.cn and transmits an ICMP request packet to the CPE.

Step 906: The CPE performs translation from private network ICMP to public network ICMP for the ICMP request packet according to the public network IP address and the public network identifier range allocated by the BNG, including translation of a source IP address and translation of an identifier, and transmits the translated ICMP request packet to the BNG.

Step 907: The BNG forwards the ICMP request packet according to a destination IP address.

Step 908: The BNG receives an ICMP reply packet responded by a network side.

Step 909: The BNG obtains a destination IP address and an identifier from the ICMP reply packet, and searches a route according to the destination IP address and a range where the identifier locates, and then transmits the packet to a corresponding CPE.

Step 910: After receiving the ICMP reply packet, the CPE translates the destination IP address and the identifier for the ICMP reply packet according to a pre-stored translation relation from an ICMP private network to a public network, and transmits the ICMP reply packet acquired after the translation to the user host.

A BNG provided according to the present embodiment includes:

an access unit configured to allocate, after acquiring that a CPE goes on line, a public network IP address and a public network identifier range to the CPE; and a route searching unit configured to, after receiving a downlink raw IP packet, forward the packet to a corresponding CPE according to a destination IP address of the downlink raw IP packet and a route of an identifier.

Preferably, the access unit is configured to allocate the public network IP address and the public network identifier range to the CPE, specifically including:

the access unit is configured to allocate the public network IP address, a transport layer port range and the public network identifier range to the CPE.

Preferably, the access unit is configured to deliver the public network IP address and the public network identifier range to the CPE through an option in DHCP or PPPoE.

Preferably,
the option allocated by the access unit includes 2 fields, an identifier value and an identifier mask, wherein a comparison result of the identifier value and the identifier mask represents the public network identifier range allocated by the BNG to the CPE.

Preferably,
the comparison result of the identifier value and the identifier mask further represents the transport layer port range allocated by the access unit to the CPE.

Preferably,
the access unit is further configured to, when allocating the public network IP address and the identifier range to the CPE, instruct a protocol type applicable to the allocated public network IP address and identifier range to the CPE.

In addition, a CPE provided according to the present embodiment includes:
a protocol processing unit, configured to receive a public network IP address and a public network identifier range allocated by a BNG;
a NAT unit configured to, according to the public network IP address and the public network identifier range received by the protocol processing unit, after receiving an uplink raw IP packet transmitted by a user, replace a source IP address in the uplink raw IP packet with the public network IP address, replace a value of an identifier field in the uplink raw IP packet with a value in the public network identifier range allocated by the BNG, and then transmit the uplink raw IP packet to the BNG.

Preferably,
the protocol processing unit is configured to receive the public network IP address, a transport layer port range and the public network identifier range allocated by the BNG.

Preferably,
the protocol processing unit is configured to acquire, through an option in DHCP or PPPoE, the public network IP address and the public network identifier range allocated by the BNG to the CPE.

Preferably,
the option received by the protocol processing unit includes 2 fields, an identifier value and an identifier mask, wherein the protocol processing unit is configured to acquire, through a comparison result of the identifier value and the identifier mask, the public network identifier range allocated by the BNG.

Preferably,
the protocol processing unit is further configured to acquire, by comparing the identifier value and the identifier mask, the transport layer port range allocated by the BNG to the CPE.

Preferably,
the protocol processing unit is further configured to receive a protocol type applicable to the public network IP address and the public network identifier range instructed and allocated by the BNG, and
the NAT unit is configured to, after receiving the uplink raw IP packet transmitted by the user and if judging that the uplink raw IP packet belongs to the protocol type applicable to the allocated public network IP address and public network identifier range, replace the source IP address in the uplink raw IP packet with the public network IP address, replace the value of the identifier field in the uplink raw IP packet with a value in the public network identifier range allocated by the BNG, and then transmit the uplink raw IP packet to the BNG.

Preferably,
the NAT unit is further configured to, after replacing the source IP address in the uplink raw IP packet with the public network IP address, and replacing the value of the identifier field in the uplink raw IP packet with a value in the public network identifier range allocated by the BNG, store corresponding relations between the IP addresses and the values of the identifier fields before and after the replacement; and
the NAT unit is further configured to, after receiving a downlink raw IP packet transmitted by the BNG, replace, according to the corresponding relations, a destination IP address in the downlink raw IP packet with a corresponding private network IP address, replace a value of an identifier field in the downlink raw IP packet with a corresponding identifier value, and then transmit the downlink raw IP packet.

A person having ordinary skill in the art may understand that all or a part of the steps in the method may be implemented by programs instructing related hardware, and the programs may be stored in a computer readable storage medium, such as a read-only memory, a magnetic disk, or an optical disk. Alternatively, all or a part of the steps in the embodiments may be also implemented by one or more integrated circuits. Accordingly, various modules/units in the embodiments may be implemented in a form of hardware, and may be also be implemented in a form of software functional modules. The present invention is not limited to any particular form of combination of hardware and software.

The above description is only preferred embodiments of the present invention and it is not intended to limit the protection scope of the present invention. There may be various other embodiments according to the inventive content of the present invention. Without departing from the spirit and essence of the present invention, those skilled in the art may make various corresponding changes and variations according to the present invention. Any modification, equivalent replacement, improvement and so on made within the spirit and principle of the present invention should be included in the protection scope of the present invention.

INDUSTRIAL APPLICABILITY

The technical solution provided by the present invention may be applied in a process of processing a raw IP packet. The technical solution that after it is acquired that a CPE goes on line, a public network IP address and a public network identifier range are allocated to the CPE; and after a downlink raw IP packet is received, the packet is forwarded to a corresponding CPE according to a destination IP address of the downlink raw IP packet and a route of an identifier is applied, thus remedying the defect that an existing NAT technology does not support forwarding of a raw IP packet and the NAT technology and a NAT device can be widely applied and deployed.

The invention claimed is:
1. A method for processing a raw Internet Protocol (IP) packet, applied on a Broadband Network Gateway (BNG) side and comprising:
after it is acquired that a Customer Premises Equipment (CPE) goes on line, allocating a public network IP address and a public network identifier range to the CPE; and after a downlink raw IP packet is received, forwarding the packet to a corresponding CPE according to a destination IP address of the downlink raw IP packet and a route of an identifier;

wherein the step of allocating, by the BNG, the public network IP address and the public network identifier range to the CPE comprises: delivering, by the BNG, the public network IP address and the public network identifier range to the CPE through an option in Dynamic Host Configuration Protocol (DHCP) or Point-to-Point Protocol Over Ethernet (PPPoE);

wherein the option allocated by the BNG comprises two fields, an identifier value and an identifier mask, wherein a comparison result of the identifier value and the identifier mask represents the public network identifier range allocated by the BNG to the CPE, or the transport layer port range allocated by the BNG to the CPE, or the public network identifier range and the transport layer port range allocated by the BNG to the CPE.

2. The method according to claim 1, wherein the step of allocating, by the BNG, the public network IP address and the public network identifier range to the CPE comprises:
allocating, by the BNG, the public network IP address, a transport layer port range and the public network identifier range to the CPE.

3. The method according to claim 1, wherein the method further comprises:
instructing, by the BNG, a protocol type applicable to the allocated public network IP address and identifier range when allocating the public network IP address and the identifier range to the CPE.

4. A method for processing a raw Internet Protocol (IP) packet, applied on a Customer Premises Equipment (CPE) side, and comprising:
receiving a public network IP address and a public network identifier range allocated by a Broadband Network Gateway (BNG); and
after an uplink raw IP packet transmitted by a user is received, replacing a source IP address in the uplink raw IP packet with the public network IP address, replacing a value of an identifier field in the uplink raw IP packet with a value in the public network identifier range allocated by the BNG, and then transmitting the uplink raw IP packet to the BNG;
wherein the step of receiving the public network IP address and the public network identifier range allocated by the BNG comprises: acquiring, by the CPE, through an option in Dynamic Host Configuration Protocol (DHCP) or Point-to-Point Protocol Over Ethernet (PPPoE), the public network IP address and the public network identifier range allocated by the BNG to the CPE;
wherein the option received by the CPE comprises two fields, an identifier value and an identifier mask, wherein the CPE acquires, through a comparison result of the identifier value and the identifier mask, the public network identifier range allocated by the BNG, or the transport layer port range allocated by the BNG, or the public network identifier range and the transport layer port range allocated by the BNG.

5. The method according to claim 4, wherein the step of receiving the public network IP address and the public network identifier range allocated by the BNG comprises:
receiving, by the CPE, the public network IP address, a transport layer port range and the public network identifier range allocated by the BNG.

6. The method according to claim 4, wherein the method further comprises:
receiving, by the CPE, a protocol type applicable to the public network IP address and the public network identifier range allocated by the BNG;
the step of replacing the source IP address in the uplink raw IP packet with the public network IP address and replacing the value of the identifier field in the uplink raw IP packet with a value in the public network identifier range allocated by the BNG after the uplink raw IP packet transmitted by the user is received, and then transmitting the uplink raw IP packet to the BNG comprises:
after the uplink raw IP packet transmitted by the user is received, if it is judged that the uplink raw IP packet belongs to the protocol type applicable to the allocated public network IP address and public network identifier range, replacing the source IP address in the uplink raw IP packet with the public network IP address, replacing the value of the identifier field in the uplink raw IP packet with a value in the public network identifier range allocated by the BNG, and then transmitting the uplink raw IP packet to the BNG.

7. The method according to claim 4, wherein the method further comprises:
after replacing the source IP address in the uplink raw IP packet with the public network IP address, and replacing the value of the identifier field in the uplink raw IP packet with a value in the public network identifier range allocated by the BNG, storing corresponding relations between the IP addresses and the values of the identifier fields before and after the replacement;
after receiving a downlink raw IP packet transmitted by the BNG, the CPE replacing, according to the corresponding relations, a destination IP address in the downlink raw IP packet with a corresponding private network IP address, replacing a value of an identifier field in the downlink raw IP packet with a corresponding identifier value, and then transmitting the downlink raw IP packet.

8. A Broadband Network Gateway (BNG), comprising:
an access unit configured to allocate, after acquiring that a Customer Premises Equipment (CPE) goes on line, a public network Internet Protocol (IP) address and a public network identifier range to the CPE; and
a route searching unit configured to, after receiving a downlink raw IP packet, forward the packet to a corresponding CPE according to a destination IP address of the downlink raw IP packet and a route of an identifier;
wherein the access unit is configured to deliver the public network IP address and the public network identifier range to the CPE through an option in Dynamic Host Configuration Protocol (DHCP) or Point-to-Point Protocol Over Ethernet (PPPoE), wherein the option comprises two fields: an identifier value and an identifier mask, a comparison result of the identifier value and the identifier mask represents the public network identifier range allocated by the BNG to the CPE, or the transport layer port range allocated by the BNG to the CPE, or the public network identifier range and the transport layer port range allocated by the BNG to the CPE.

9. The BNG according to claim 8, wherein
the access unit is further configured to allocate the public network IP address, a transport layer port range and the public network identifier range to the CPE.

10. The BNG according to claim 8, wherein
the access unit is further configured to, when allocating the public network IP address and the identifier range to the CPE, instruct a protocol type applicable to the allocated public network IP address and identifier range to the CPE.

11. A Customer Premises Equipment (CPE), comprising:
a protocol processing unit, configured to receive a public network Internet Protocol (IP) address and a public network identifier range allocated by a Broadband Network Gateway (BNG);
a Network Address Translation (NAT) unit configured to, according to the public network IP address and the public network identifier range received by the protocol processing unit, after receiving an uplink raw IP packet transmitted by a user, replace a source IP address in the uplink raw IP packet with the public network IP address, replace a value of an identifier field in the uplink raw IP packet with a value in the public network identifier range allocated by the BNG, and then transmit the uplink raw IP packet to the BNG;
wherein the protocol processing unit is configured to acquire, through an option in Dynamic Host Configuration Protocol (DHCP) or Point-to-Point Protocol Over Ethernet (PPPoE), the public network IP address and the public network identifier range allocated by the BNG to the CPE, wherein the option comprises two fields: an identifier value and an identifier mask;
wherein the protocol processing unit is configured to acquire, through a comparison result of the identifier value and the identifier mask, the public network identifier range allocated by the BNG, or the transport layer port range allocated by the BNG, or the public network identifier range and the transport layer port range allocated by the BNG.

12. The CPE according to claim 11, wherein
the protocol processing unit is configured to receive the public network IP address, a transport layer port range and the public network identifier range allocated by the BNG.

13. The CPE according to claim 11, wherein
the protocol processing unit is further configured to receive a protocol type applicable to the public network IP address and the public network identifier range instructed and allocated by the BNG; and
the NAT unit is configured to, after receiving the uplink raw IP packet transmitted by the user and if judging that the uplink raw IP packet belongs to the protocol type applicable to the allocated public network IP address and public network identifier range, replace the source IP address in the uplink raw IP packet with the public network IP address, replace the value of the identifier field in the uplink raw IP packet with a value in the public network identifier range allocated by the BNG, and then transmit the uplink raw IP packet to the BNG.

14. The CPE according to claim 11, wherein
the NAT unit is further configured to, after replacing the source IP address in the uplink raw IP packet with the public network IP address and replacing the value of the identifier field in the uplink raw IP packet with a value in the public network identifier range allocated by the BNG, store corresponding relations between the IP addresses and the values of the identifier fields before and after the replacement; and
the NAT unit is further configured to, after receiving a downlink raw IP packet transmitted by the BNG, replace, according to the corresponding relations, a destination IP address in the downlink raw IP packet with a corresponding private network IP address, replace a value of an identifier field in the downlink raw IP packet with a corresponding identifier value, and then transmit the downlink raw IP packet.

* * * * *